Oct. 19, 1948.   J. A. DI BARTOLOMEO   2,451,665
CHILD'S VEHICLE
Filed Nov. 12, 1947
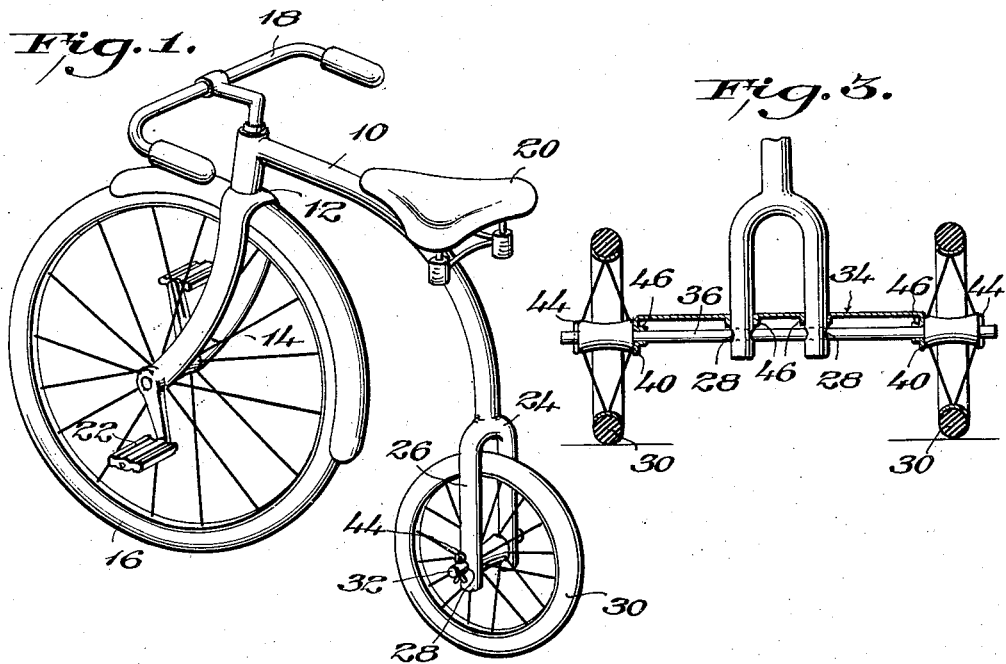
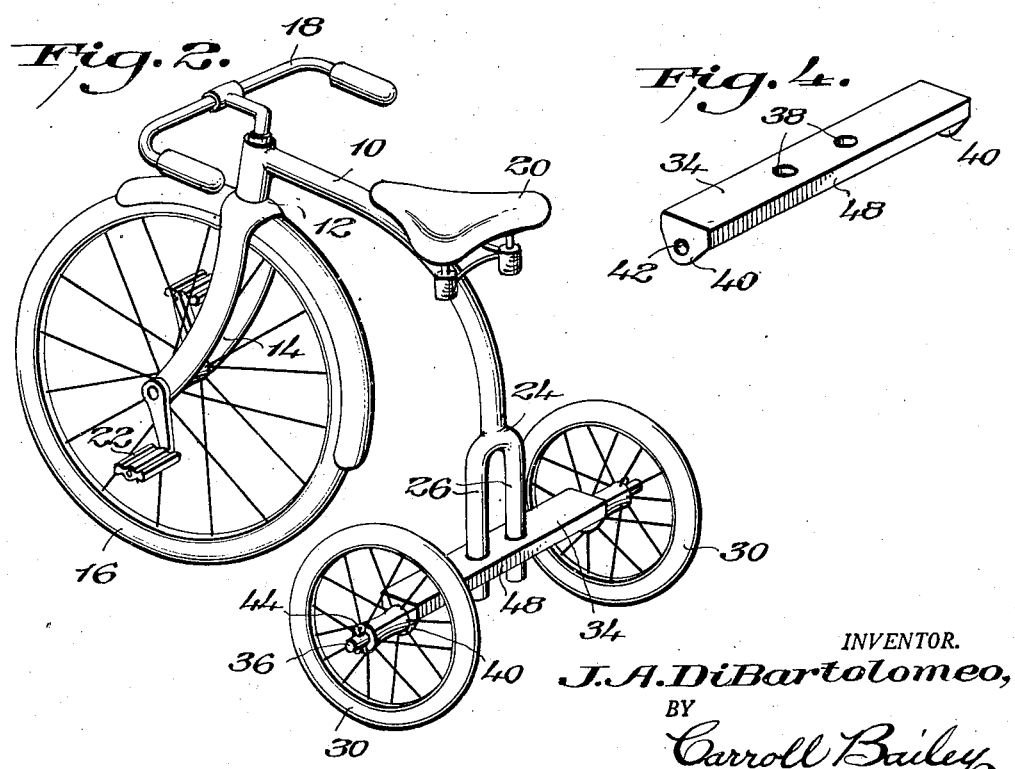
INVENTOR.
J. A. DiBartolomeo,
BY
Carroll Bailey
ATTORNEY Patented Oct. 19, 1948

2,451,665

UNITED STATES PATENT OFFICE 2,451,665

CHILD'S VEHICLE

Joseph A. Di Bartolomeo, Baltimore, Md.

Application November 12, 1947, Serial No. 785,363

4 Claims. (Cl. 280—7.15)

This invention relates to children's vehicles, such as bicycles, tricycles and the like, which may or may not be pedal-propelled, and has for its general object to provide a vehicle of this type embodying a simple, practical construction such that it may readily and easily be converted, even by a child, from a bicycle into a tricycle, or from a tricycle into a bicycle.

With the foregoing general object in view, the invention consists in a bicycle-tricycle conversion structure embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 1 is a perspective view of a convertible vehicle constructed in accordance with the invention and of bicycle form.

Fig. 2 is a perspective view of the same vehicle converted to tricycle form.

Fig. 3 is a cross sectional view through the rear of the vehicle shown in Fig. 2; and Fig. 4 is a perspective view of the plate employed for effecting the conversion from a bicycle to a tricycle.

Referring to the drawings in detail, it will be observed that the present vehicle comprises, as usual, a main frame or "backbone" member, designated generally as 10, and a front frame or steering post member, designated generally as 12, which latter is mounted in the front end portion of said main frame or "backbone" member for rotary or steering movements. It will further be observed that, as usual, the front frame or steering post member 12 is formed, at its lower end, with a fork 14, wherein is mounted a front or steering wheel 16, and, at its upper end, is provided with handle bars 18 for effecting rotary or steering movements thereof. On the main frame or "backbone" member 10 is mounted, as usual, a seat or saddle 20, while fixed with respect to the hub of the front or steering wheel 16 are pedals 22 for foot operation by a child seated on the seat or saddle 20 to rotate said front wheel and thus propel the vehicle.

In accordance with the present invention the rear portion of the main frame or "backbone" member 10 is directed downwardly and has its lower end portion formed as a fork 24 the limbs 26 of which are spaced apart only sufficiently to readily accommodate between them a single rear wheel. Through the lower end portions of the limbs 26 are formed transversely extending, alined, axle-accommodating holes 28.

When the vehicle is to be used as a bicycle, as illustrated in Fig. 1 of the drawings, a single rear wheel 30 is mounted in the fork 24 by means of a suitable short axle 32 which is passed through the holes 28 in the limbs 26 of said fork and through the hub of the wheel 30. On the other hand, when the vehicle is to be used as a tricycle, as illustrated in Fig. 2 of the drawings, a plate 34 is employed for cooperation with the fork 24 and a suitable long axle 36 to mount two rear wheels 30, 30, on the rear of the main frame member 10, one to either side of the fork 24, in suitable spaced apart relationship to each other.

The plate 34 is formed from sheet metal of suitable stiffness and strength and may be of any desired length and width. In the medial portion of said plate are two holes 38 which are of sizes to accommodate neatly the limbs 26, 26 of the fork 24 and which have the same spaced apart relationship, longitudinally of said plate, as said limbs. Thus, said limbs 26, 26 may readily be inserted through said holes and when so inserted serve to hold said plate transversely disposed relative to the vehicle.

At or adjacent to its ends the plate 34 is provided with downwardly extending ears 40 in which are alined holes 42 which are of sizes to accommodate the long axle 36 and which are disposed in the same vertical plane as the holes 38. Thus, when the legs 26 of the fork 24 are inserted through the holes 38, the holes 28 in said legs may be brought into alinement with the holes 42 in the ears 40 so that the axle 36 may be inserted through the said holes 42 and 28. Obviously, when the axle 36 is inserted through the holes 42 and 28, it serves to interlock the plate 34 with the fork 24, as best illustrated in Fig. 3 of the drawings. In this connection it will be noted that said axle is of greater length than the plate 34 by an amount such that, when it is operatively engaged with the plate 34 and the limbs 26, its end portions project beyond the ears 40 sufficiently to have mounted thereon the wheels 30, 30, respectively.

Each of the axles 32 and 36 may be simply in the form of a rod of circular cross section provided adjacent to its ends with transverse holes to receive cotter pins 44 to secure it against accidental displacement from its operative position, or, alternatively, either of said axles may have any other suitable means associated with its end positions to retain it in its operative position. In any event, it will be apparent that if the vehicle is of bicycle form, as illustrated in Fig. 1, and it should be desired to convert the same to tricycle form, all that is necessary is to remove one of the cotter pins 44, remove the short axle 32 and the wheel 30, apply the plate 34 to the limbs 26 of the fork 24, insert the long axle 36 through the holes 42 and 28 to interlock said plate with said limbs 26, apply the two wheels 30 to the ends of the axle 36, and insert cotter pins 44 in the transverse holes in the end portions of said axle 36 to retain the wheels on said axle and the latter in assembly with the vehicle. If, on the other hand, the vehicle should be of tricycle form and it should be desired to convert the same to bicycle form, the operation just recounted simply is reversed. Obviously, either conversion is so simple that it may be effected even by a child.

If desired, the plate 34 may be provided with flanges 46 in surrounding relationship to the holes 38 and 42 to reinforce said plate at the points where said holes are formed therein and to provide longer bearings for the limbs 26 and the axle 36 than are afforded by the thickness of the metal from which said plate 34 is formed. Also, if desired, the plate 34 may be provided at its sides with stiffening flanges 48. However, neither the flanges 46 nor the flanges 48 are essential. Further, if desired, the rear fork 24 may be of a size to accommodate a wheel of the same size as the front wheel 16.

Obviously, the plate 34 serves not only as a spacer for the wheels 30, 30, but also to support the axle 36 against bending under loads imposed upon the vehicle.

From the foregoing description considered in connection with the accompanying drawings it is believed that the present conversion structure will be clearly understood and its advantages appreciated. It is desired to point out, however, that while only a single specific structural embodiment of the invention has been illustrated and described, the same is readily capable of specifically different structural embodiments within its spirit and scope as defined in the appended claims.

I claim:

1. A bicycle-tricycle conversion structure comprising a main frame member having at its rear end a downwardly extending fork the limbs of which are spaced apart only sufficiently to readily accommodate between them a single rear wheel, said limbs having in their lower end portions alined holes to accommodate an axle to mount a wheel between said limbs, a plate having in its medial portion a pair of holes to receive the limbs of said fork and provided at its ends with ears having therein alined holes disposed in the same vertical plane as said pair of holes to accommodate a wheel axle, and a wheel axle insertable through the holes in said ears and through the holes in said limbs when the latter are disposed in the holes in said plate to interlock said plate with said limbs, said axle being adapted to have a pair of wheels mounted on its end portions outwardly of said ears, respectively.

2. A bicycle-tricycle conversion structure comprising a main frame member having at its rear end a downwardly extending fork the limbs of which are spaced apart only sufficiently to readily accommodate between them a single rear wheel, said limbs having in their lower end portions alined holes to accommodate an axle to mount a wheel between said limbs, a plate having in its medial portion a pair of holes to receive the limbs of said fork and provided at its ends with downwardly extending ears having therein alined holes disposed below said plate and in the same vertical plane as said pair of holes to accommodate a wheel axle, and a wheel axle insertable through the holes in said ears and through the holes in said limbs when the latter are disposed in the holes in said plate to interlock said plate with said limbs, said axle being adapted to have a pair of wheels mounted on its end portions outwardly of said ears, respectively.

3. A bicycle-tricycle conversion structure as set forth in claim 1 in which the sides of the plate are flanged.

4. In combination with a vehicle of the bicycle type including a main frame having at its rear end a downwardly extending fork composed of a pair of limbs having alined axle-accommodating holes in their lower end portions, a plate having in its medial portion a pair of holes to accommodate the limbs of said fork and provided at its ends with ears having alined holes disposed in the same vertical plane as said pair of holes, and an axle insertable through the holes in said ears and through the holes in said limbs when the latter are disposed in the holes in said plate to interlock said plate with said limbs, said axle being adapted to have mounted on its end portions outwardly of said ears a pair of rear supporting wheels for the vehicle.

JOSEPH A. DI BARTOLOMEO.

REFERENCES CITED

The following references are of record in the file of this patent:

UNITED STATES PATENTS

| Number | Name | Date |
|---|---|---|
| 2,209,058 | Johnson | July 23, 1940 |
| 2,212,741 | Johnson | Aug. 27, 1940 |